Figure 1:
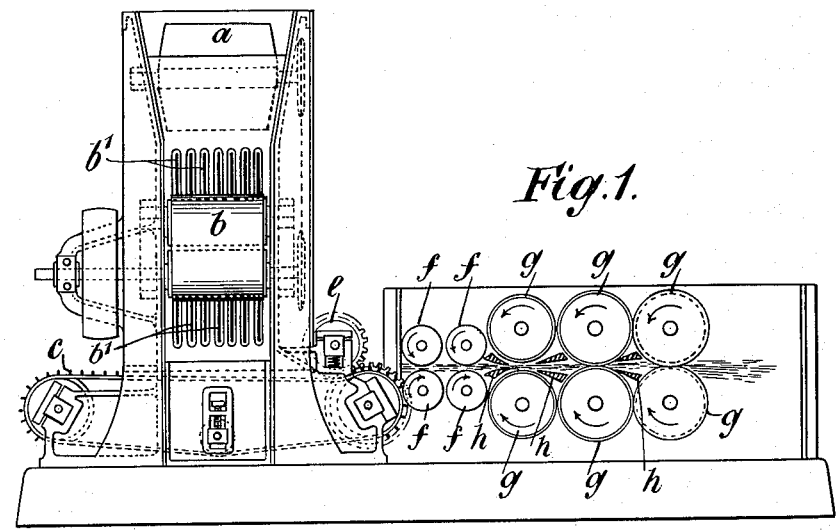

L. CARRE.
PROCESS OF TREATMENT OF STRAW, DRIED GRASSES, OR THE LIKE FOR THE PRODUCTION OF ARTICLES OF COMMERCE.
APPLICATION FILED AUG. 16, 1910.

1,014,566.

Patented Jan. 9, 1912.
4 SHEETS—SHEET 1.

WITNESSES
A. F. Houman
John E. Sanders

INVENTOR:
Louis Carré,
By Wm Wallace White
Att'y.

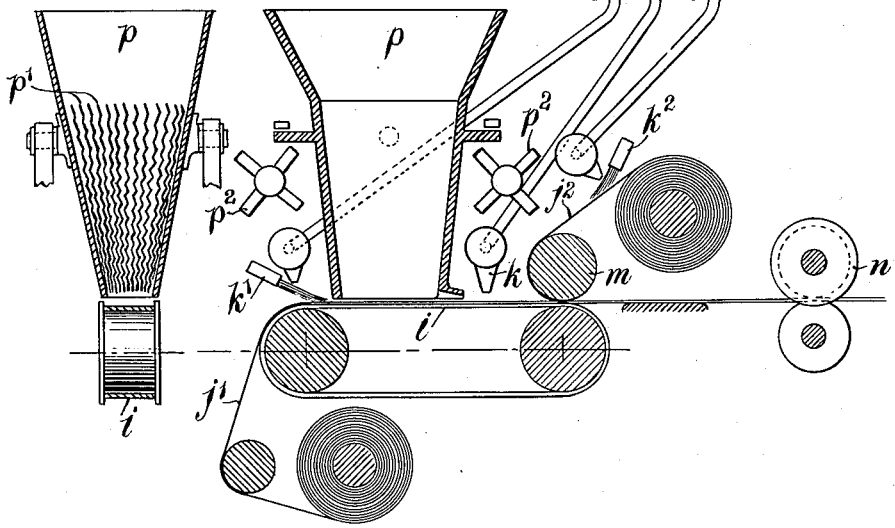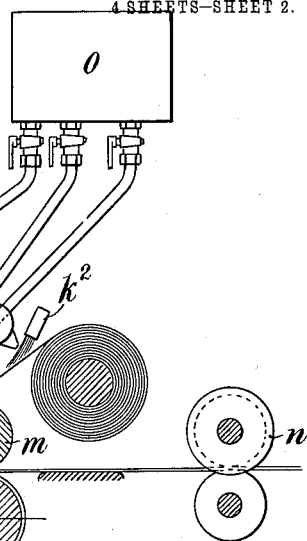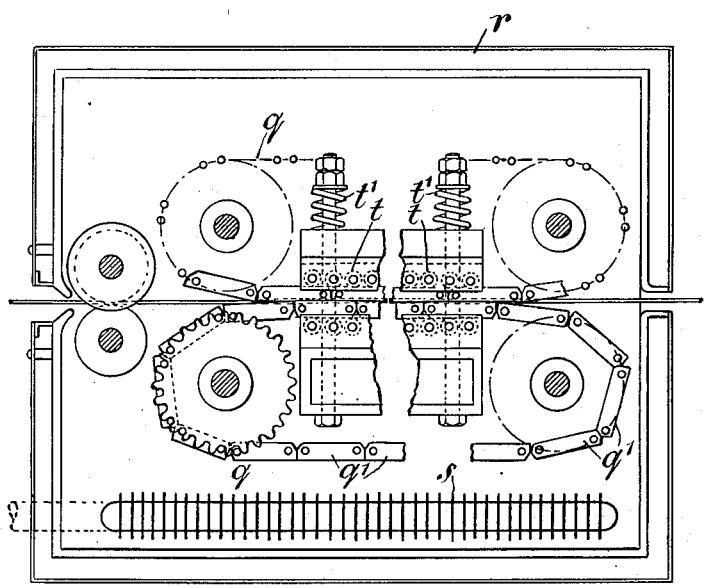

L. CARRE.
PROCESS OF TREATMENT OF STRAW, DRIED GRASSES, OR THE LIKE FOR THE PRODUCTION OF ARTICLES OF COMMERCE.
APPLICATION FILED AUG. 16, 1910.
1,014,566.
Patented Jan. 9, 1912.
4 SHEETS—SHEET 3.
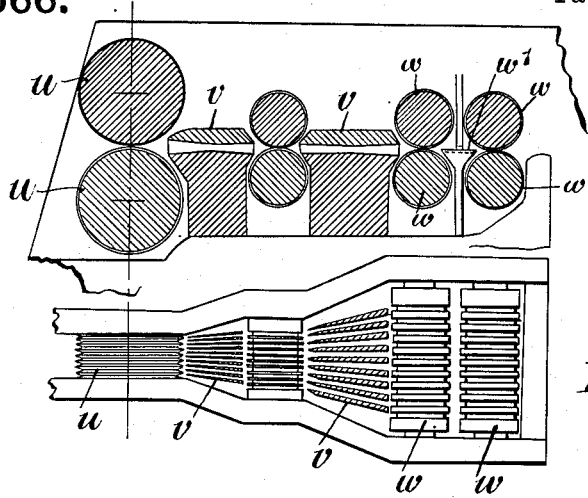
Fig. 9.
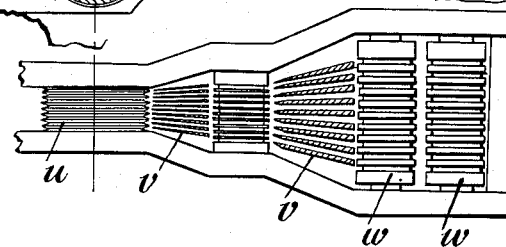
Fig. 10.
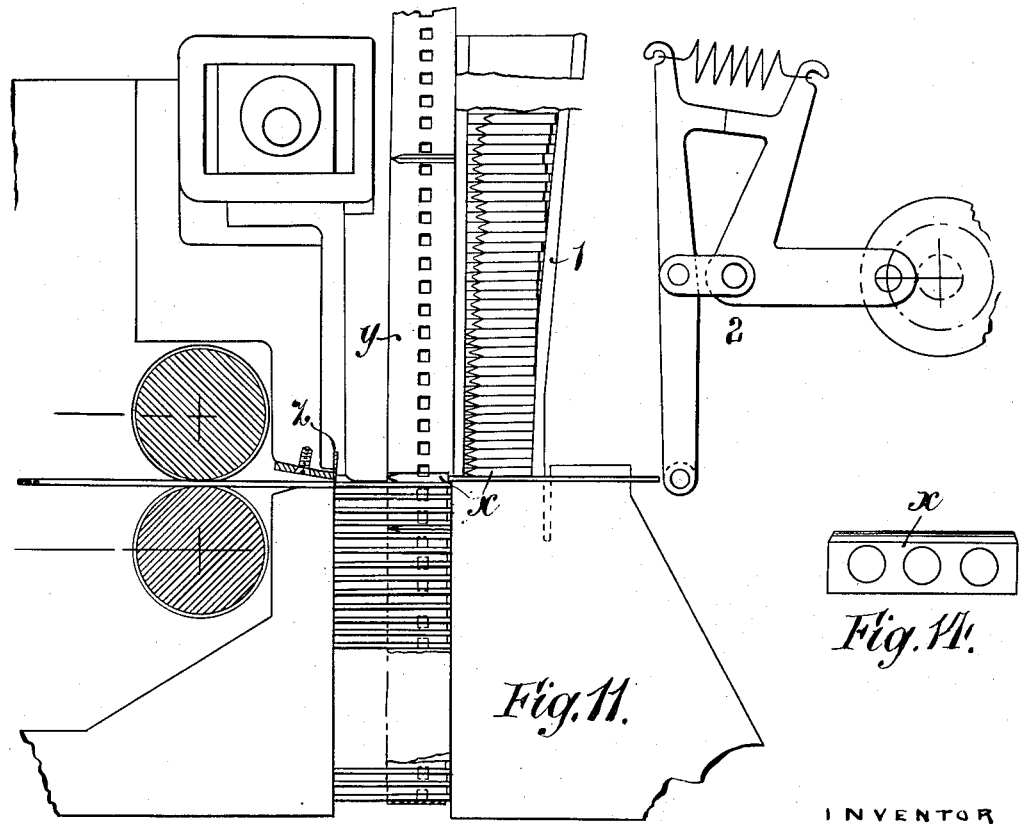
Fig. 11.
Fig. 14.
INVENTOR
Louis Carré.
By Wm Wallace White
Atty.
WITNESSES
A. F. Heuman
John C. Sanders L. CARRE.
PROCESS OF TREATMENT OF STRAW, DRIED GRASSES, OR THE LIKE FOR THE PRODUCTION OF ARTICLES OF COMMERCE.
APPLICATION FILED AUG. 16, 1910.

1,014,566.

Patented Jan. 9, 1912.

4 SHEETS—SHEET 4.

WITNESSES.
A. F. Heuman
John C. Sanders

INVENTOR
Louis Carré.
By Wm Wallace White
Att'y

UNITED STATES PATENT OFFICE.

LOUIS CARRÉ, OF LONDON, ENGLAND.

PROCESS OF TREATMENT OF STRAW, DRIED GRASSES, OR THE LIKE FOR THE PRODUCTION OF ARTICLES OF COMMERCE.

1,014,566.   Specification of Letters Patent.   Patented Jan. 9, 1912.

Application filed August 16, 1910. Serial No. 577,447.

*To all whom it may concern:*

Be it known that I, LOUIS CARRÉ, citizen of the Republic of France, residing at No. 24 Mark Lane, London, England, have invented a new or Improved Process of Treatment of Straw, Dried Grasses, or the Like for the Production of Articles of Commerce, of which the following is a specification.

This invention relates to a new or improved process of treatment of straws, dried grasses or the like, whereby such material can be rendered suitable for manufacture into various useful articles.

The process comprises essentially the longitudinal division of the straws, grasses and the like into relatively narrow filaments, and other operations, the nature of which will be presently described. The like material has previously been used in the manufacture of some of the substances which I propose to produce but in the operations hitherto, the material has been cut into small short fragments whereas, according to the present invention, I conserve the cross strength of the raw material by preserving as much as possible its longitudinal dimension, and I expose the inner surfaces of the tubular walls of the raw material.

When intended for the manufacture of match-splints the material is soaked in melted hydro-carbon or other flammable substance either before or after the dividing operation, or alternatively still later in the process of manufacture, and also for the purpose of making such match-splints or for the purpose of making thin or thick boards, a layer of the longitudinally divided material is impregnated with a binding substance such as starch in the condition of a liquid, semi-fluid or as a dry powder, and pressed between two sheets of paper or the like substance, and subsequently heated and molded or flattened under pressure.

The operations are adapted to be performed in a more or less continuous manner so that the match-splints produced thereby can be conveyed into and assembled in a separated manner in preparation for soaking in flammable substance and subsequent dipping of the ends in igniting paste, as will presently be described by reference to the accompanying drawings, which illustrate the components of a machine adapted to carry out the described process in a semi-automatic manner.

Figure 2:
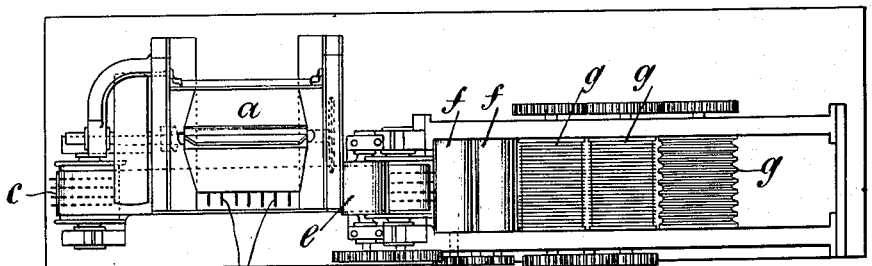
Figure 3:
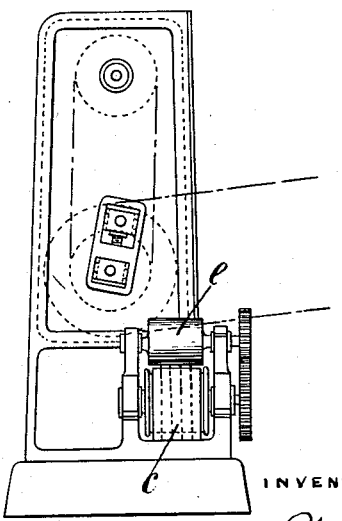
Figure 4:
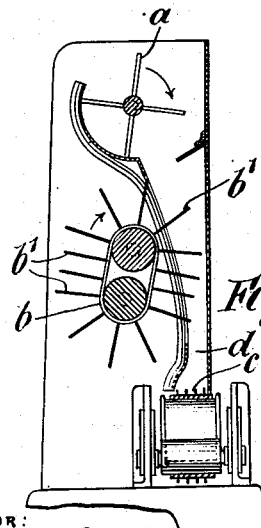
Figure 12:
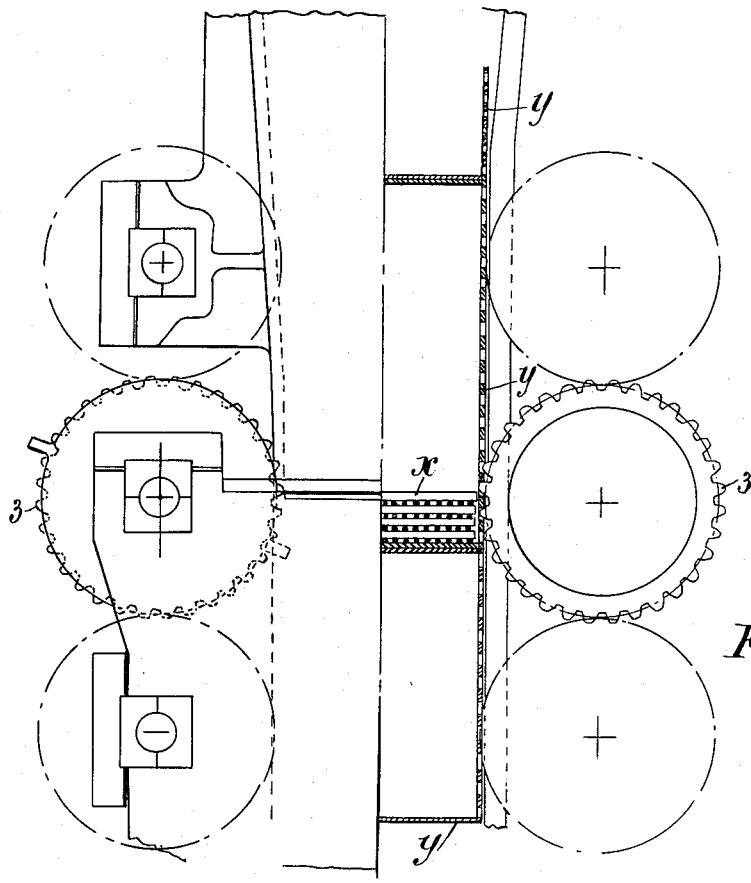
Figure 13:
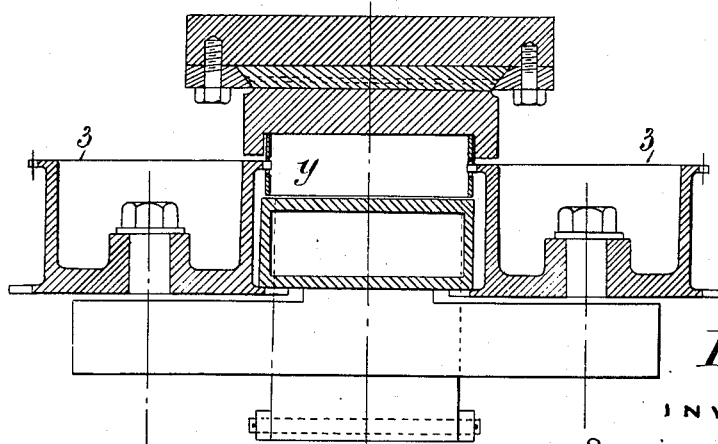

In these drawings:—Figure 1 is a side elevation of the portion of the machine whereby the stalks are assembled, crushed and cut into filaments. Fig. 2 is a plan of the same. Fig. 3 is an end elevation, and Fig. 4 is a sectional elevation taken along a vertical plane through 4—4 of Figs. 1 and 2. Fig. 5 is a sectional side elevation of the portion of the machine whereby a layer of filaments or other divided material is inclosed in an adhesive manner between two sheets of paper or other fabric and impregnated with a binding substance, the figure comprising a hopper for the re-assembling of the filaments in the case in which the previous produced stream of material is interrupted. Fig. 6 is a sectional elevation taken along the vertical plane 6—6 of Fig. 5. Fig. 7 is a side elevation of the portion of the machine whereby the molding operation is performed, Fig. 8 showing, on an enlarged scale, a section of the molding plates employed in the molding of match-splints. Fig. 9 is a sectional elevation and Fig. 10 is a plan of the portion of the machine whereby the layer of molded match-splints is divided into individual splints, laterally diverged and the surfaces thereof smoothed. Fig. 11 is a side elevation of the part of the machine whereby the spread ends of the match-splints are assembled in carriers for dipping and equal lengths thereof cut off. Fig. 12 is an end elevation of the same portion of the machine. Fig. 13 is a sectional plan taken along a horizontal plane through 13—13 of Fig. 12, and Fig. 14 shows a detail.

The portion of the machine shown in Figs. 1 and 2 is designed to perform the operation of providing a continuous stream of straw or the like material so arranged in a layer that the individual stalks lie in the direction of the stream with their ends separated longitudinally, the cross section of the layer being as uniform as possible.

Preparatory to placing the straw into the machine it is gathered together into bundles or sheaves without binding and, if the straw is not well assorted, it may be passed through a duplex guillotine or equivalent apparatus to cut off the heads or ears and roots or fag ends, so as to produce a bundle of stalks of fairly uniform length. The bundles are then fed successively to the several compartments of a drum $a$ which serves to define what may be described as the polarized condition of the stalks. From the compartments of $a$ the stalks drop between the descending fingers $b^1$ of a belt $b$ which serve to divide each bundle and promote the deposit of the stalks in a polarized condition on to a conveying band $c$. The fingers protrude through slits formed in one side of a trunk passage $d$, which passage converges and subsequently diverges. The belt $b$ with fingers $b^1$ may be provided in duplicate, the fingers of the second belt overlapping those of the first in an interposed manner. The conveying band may advantageously be provided with upstanding spikes to conserve the width of the stream and assist in the maintenance of the polarity of the stalks. The stream passes under a compacting roller $e$ and progresses to the next portion of the machine. Means for effecting the driving and for adjusting the tightness of the belt $b$ and conveying band $c$ are sufficiently indicated in the drawing to require no further description.

The next operation is that of crushing the stream between pairs of rollers $f\ f$ so that the individual stalks are flattened. These rollers are advantageously serrated longitudinally to insure the propulsion of the stream between the cutters whereby the stalks are parted each into a plurality of narrow longitudinal filaments by passing between pairs of cutting rollers $g\ g$ in succession, so formed that sharp edged projecting rings on one element of each pair engages within ring-grooves formed in the other element of the pair. $h\ h$ are guides to constrain the stream to flow from one pair of rollers to the next in succession. The stream is now composed of filaments and, as a consolidated or molded product is required, the material passes to a contrivance whereby it is impregnated with a binding substance and laid between two adhesive sheets of paper. This operation is performed by a portion of the machine shown in Fig. 5 though this figure and Fig. 6 show also means for restarting a uniform stream of filaments produced as above described and cut into lengths, the filaments being deposited in a polarized condition with their ends separated longitudinally.

The layer as it leaves the cutting rollers $g\ g$ or a newly assembled layer of filaments, is deposited on an endless band $i$ which conveys a strip of paper $j^1$, or the like fabric, to the upper surface of which an adhesive is applied by a brush $k^1$. In the case in which the original stream is deposited on the strip of paper the brush $k^1$ is otherwise suitably situated and the hopper shown in Figs. 5 and 6 is omitted. As the layer of filaments passes under the feeding spout $k$ a binding substance is supplied to drop into the interstices between the filaments. In the drawing it is indicated that the binding substance is in a liquid or semi-fluid condition but it may be in the form of powder which is subsequently wetted, or the wetting may precede the deposit of the powder. Starch is a suitable binding substance either in the form of powder, paste or a solution. After the deposit of the binding substance the layer passes under a roller $m$ around which is conveyed a second strip of paper $j^2$ the under surface of which is rendered adhesive by a brush $k^2$. The impregnated layer inclosed between two strips of paper is then conveyed between a pair of rollers $n$ which squeeze the components of the layer into close contact.

The adhesive and the binding substance are shown as being delivered through the same tank $o$ through regulating taps but this may be varied.

The operation of the portion of the machine shown in Figs. 1–4 may be rapid and perhaps that of Fig. 5 may be able to keep pace therewith, but if not, the process can be restarted by reforming a layer composed of equal lengths of filaments deposited on the adhesive strip of paper. For this purpose the hopper $p$ is provided which contains a plurality of thin corrugated partitions $p^1$. The hopper is so mounted that it may be vibrated by rotating knockers $p^2$ for the purpose of assisting the descent of the filaments and preventing the hopper from becoming clogged. The filaments in dropping down the passages between adjacent partitions, which passages have each a transverse section of sinuous shape, will become polarized.

The next operation of molding and consolidating the components of the paper-inclosed layer and hardening the same by the evaporation of the moisture which is combined with the adhesive and binding substance, while the layer is under pressure, is necessarily slow, so that, if the preliminary operation is not interrupted prior to impregnation with the binding substance, it will be necessary to interrupt it prior to the present stage. This operation is performed by passing the layer between two endless chains of links $q\ q$, Fig. 7, which progress slowly within a chamber $r$, heated by a radiator $s$ for example. During the transit between the components of the endless chains, the links of one chain are forcibly pressed toward those of the other by means of rollers $t\ t$ which bear on the backs of the links $q^1\ q^1$ and are elastically forced by springs $t^1$.

The surfaces of the links which make contact with the interposed strip may be smooth when a flat board is required, or may be shaped to any desired configuration when the flexible and moldable strip is required to take a special shape. The surfaces may for example be such as to produce a corrugated strip and withal, the corrugated strip may be so otherwise molded as to form one half of an envelop to fit the outer surface of a bottle.

In Fig. 8 is shown in transverse section a pair of links, the surfaces of which are so prepared as to mold the strip into a plurality of cylindrical splints which on emerging from the chamber are united by very thin fins. The heated chamber may be so lengthened that the strip undergoes a preliminary heating prior to entrance between the links of the chain, and also subsequently to emergence from the inclosing links.

Alternatively to molding the layer in a continuous manner as above described, it may be cut into lengths and pressed between a pair of molds by a press of ordinary description. As a further alternative the strip may be helically wound on a mandrel to compose a tube, and a second helix may be adhesively wound around the first helix of opposite pitch or with the like pitch interspaced, and thus a tube of any length may be produced to serve as a pipe or for other useful purpose. The purpose of the operation being the production of match-splints, the layer of fin-connected splints is then slit at the leading end by revolving cutters $u$ Figs. 9 and 10, after which it may pass directly under a guillotine adapted to cut the splints into required lengths suitable for matches, and treated in the manner at present employed for wooden matches. Alternatively to this, the leading slitted end of the layer of splints pass through one or more divergers $v$ $v$ and between pairs of propelling rollers $w$ $w$ and through the orifices of a perforated plate $w^1$ to scrape and clean the surfaces and then on to an assembling contrivance, Figs. 11–13, whereby the leading ends of the diverged splints are inserted between distance pieces $x$ in layers within a frame $y$ so as to project from the frame to the extent of about half the length of the match. After assembly, the splints are cut off by the guillotine $z$.

A mechanism for interposing the distance pieces $x$ taken from the hopper 1 is shown in Fig. 11 by 2. The frames are displaced progressively downward by spur-wheels 3 . . . 3 the teeth of which gear with apertures formed in the sides of the frames. The frames filled with match splints, are then passed to be soaked in combustible liquid to the extent of about half their length, after which the extremities are dipped into igniting paste.

The operation described as being performed by the portion of the machine shown in Fig. 5, whereby a layer of divided material impregnated with a binding substance and inclosed in an adhesive manner between strips of paper and the like fabric may be produced, may be employed to manufacture a corresponding layer with any other interposed divided material such as hemp, wool or even sawdust. Moreover the layer may be composed of a series of strata of filaments or fibers deposited in a manner to cross one another. For this purpose a succession of hoppers, constructed as shown in Figs. 5 and 6, may be employed in which the planes of the corrugated partitions are variously inclined to the line of travel of the conveying belt. By adding adhesive material between each layer, a thick board with crossing fibers can be built up and subsequently consolidated under heat and pressure.

I claim:

1. For the production of a rigid consolidated product from straw or the like material, a process consisting in arranging longitudinally the straw or the like, crushing same, cutting same into longitudinal filaments, impregnating same with a starchy substance and consolidating same under pressure and heat.

2. For the production of a rigid consolidated product from straw or the like material, a process consisting in arranging longitudinally the straw or the like, crushing same, cutting same into longitudinal filaments, impregnating same with a starchy substance and consolidating same under pressure and heat into boards.

3. For the production of match-splints from straw or the like material, a process consisting in arranging longitudinally the straw or the like, crushing same, cutting same into longitudinal filaments, impregnating same with a starchy substance, consolidating and molding same under pressure and heat into boards consisting of fin-connected splints and laterally separating said splints.

4. For the production of match-splints from straw or the like material, a process consisting in arranging longitudinally the straw or the like, crushing same, cutting same into longitudinal filaments, impregnating same with a starchy substance, consolidating and molding same under pressure and heat into boards consisting of fin-connected splints laterally separating said splints and cutting said splints into uniform lengths.

5. For the production of match-splints from straw or the like material, a process consisting in arranging longitudinally the straw or the like, crushing same, cutting same into longitudinal filaments, impregnating same with a starchy substance, consolidating and molding same under pressure and heat into boards consisting of fin-connected splints laterally separating said splints, cutting said splints into uniform lengths and assembling said splints in superposed separated layers.

6. For the production of match-splints from straw or the like material, a process consisting in arranging longitudinally the straw or the like, crushing same, cutting same into longitudinal filaments, impregnating same with a binding substance and consolidating and molding same under pressure into boards consisting of fin-connected splints.

7. For the production of match-splints from straw or the like material, a process consisting in arranging longitudinally the straw or the like, crushing same, cutting same into longitudinal filaments, impregnating same with a binding substance and consolidating and molding same under pressure and heat into boards consisting of fin-connected splints.

8. For the production of match-splints from straw or the like material, a process consisting in arranging longitudinally the straw or the like, crushing same, cutting same into longitudinal filaments, impregnating same with a binding substance, consolidating and molding same under pressure into boards consisting of fin-connected splints and laterally separating said splints.

9. For the production of match-splints from straw or the like material, a process consisting in arranging longitudinally the straw or the like, crushing same, cutting same into longitudinal filaments, impregnating same with a binding substance, consolidating and molding same under pressure and heat into boards consisting of fin-connected splints and laterally separating said splints.

10. For the production of match-splints from straw or the like material, a process consisting in arranging longitudinally the straw or the like, crushing same, cutting same into longitudinal filaments, impregnating same with a binding substance, consolidating and molding same under pressure into boards consisting of fin-connected splints, laterally separating said splints and cutting said splints into uniform lengths.

11. For the production of match-splints from straw or the like material, a process consisting in arranging longitudinally the straw or the like, crushing same, cutting same into longitudinal filaments, impregnating same with a binding substance, consolidating and molding same under pressure and heat into boards consisting of fin-connected splints, laterally separating said splints and cutting said splints into uniform lengths.

12. For the production of match-splints from straw or the like material, a process consisting in arranging longitudinally the straw or the like, crushing same, cutting same into longitudinal filaments, impregnating same with a binding substance, consolidating and molding same under pressure into boards consisting of fin-connected splints, laterally separating said splints, cutting said splints into uniform lengths and assembling said splints in superposed separated layers.

13. For the production of match-splints from straw or the like material, a process consisting in arranging longitudinally the straw or the like, crushing same, cutting same into longitudinal filaments, impregnating same with a binding substance, consolidating and molding same under pressure and heat into boards consisting of fin-connected splints, laterally separating said splints, cutting said splints into uniform lengths and assembling said splints in superposed separated layers.

In testimony whereof I have signed my name to this specification in the presence of two subscribing witnesses.

LOUIS CARRÉ.

Witnesses:
H. W. WAGHORN,
H. O. JAMISON.